US010914282B2

(12) United States Patent
Brewer

(10) Patent No.: US 10,914,282 B2
(45) Date of Patent: Feb. 9, 2021

(54) MULTI-ROTOR, MULTI-AXIS WIND TURBINE

(71) Applicant: George Woodrow Brewer, North Las Vegas, NV (US)

(72) Inventor: George Woodrow Brewer, North Las Vegas, NV (US)

( * ) Notice: Subject to any disclaimer, the term of this patent is extended or adjusted under 35 U.S.C. 154(b) by 133 days.

(21) Appl. No.: 16/172,645

(22) Filed: Oct. 26, 2018

(65) Prior Publication Data

US 2020/0132043 A1 Apr. 30, 2020

(51) Int. Cl.
| | | |
|---|---|---|
| *F03D 1/02* | (2006.01) | |
| *F03D 1/06* | (2006.01) | |
| *F03D 3/00* | (2006.01) | |
| *F03D 3/06* | (2006.01) | |
| *F03D 3/02* | (2006.01) | |
| *F03D 9/25* | (2016.01) | |

(52) U.S. Cl.
CPC ............. *F03D 1/02* (2013.01); *F03D 1/0633* (2013.01); *F03D 3/005* (2013.01); *F03D 3/02* (2013.01); *F03D 3/061* (2013.01); *F03D 9/25* (2016.05); *F05B 2240/211* (2013.01); *F05B 2240/2211* (2013.01)

(58) Field of Classification Search
CPC .................................. F03D 1/02; F01D 1/025
See application file for complete search history.

(56) References Cited

U.S. PATENT DOCUMENTS

| | | | | |
|---|---|---|---|---|
| 4,110,631 A | * | 8/1978 | Salter ...................... | F03D 1/02 290/55 |
| 5,380,149 A | | 1/1995 | Valsamidis | |
| 5,876,181 A | * | 3/1999 | Shin ........................ | F03D 1/06 415/2.1 |
| 6,641,367 B1 | * | 11/2003 | Van der Klippe ........ | F03D 1/02 416/99 |
| 6,779,966 B2 | | 8/2004 | Smith, II | |
| 6,948,910 B2 | * | 9/2005 | Polacsek ............... | F03D 1/0608 416/1 |
| 7,296,974 B2 | * | 11/2007 | Wobben .................. | F03D 80/70 416/132 B |
| 7,309,213 B2 | * | 12/2007 | Steinke .................. | B63H 1/265 415/908 |
| 7,494,315 B2 | | 2/2009 | Hart | |
| 7,755,210 B2 | | 7/2010 | Kammer | |
| 2009/0196748 A1 | * | 8/2009 | Salter ...................... | F03D 80/50 416/120 |
| 2014/0112777 A1 | * | 4/2014 | Kalra ...................... | F03D 7/048 416/1 |

* cited by examiner

*Primary Examiner* — Justin D Seabe

(57) ABSTRACT

A multi-rotor, multi-axis wind turbine where the rotors are in relative motion to one another to maximize the energy captured and thus generated, where there is a primary rotor axis and direction and one or more secondary rotor axes, where each rotor rotates about a different axis, and the rotors can operate in either a horizontal or vertical axis orientation or some orientation in between, and there are at least two rotor axes operating in different directions such that the relative motion of the primary rotor drives at least one secondary rotor into the surrounding air increasing the relative net vector velocity of the secondary rotor with respect to the wind velocity and surrounding air which increases the amount of energy captured at a given location for a given wind velocity over the prior art.

8 Claims, 8 Drawing Sheets

MULTI-ROTOR, MULTI-AXIS WIND TURBINE

CROSS-REFERENCE TO RELATED APPLICATIONS

Not Applicable

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable

REFERENCE TO SEQUENCE LISTING

Not Applicable

STATEMENT REGARDING PRIOR DISCLOSURES BY THE INVENTOR

Not Applicable

BACKGROUND OF THE INVENTION

1. Field of the Invention

Figure 1:
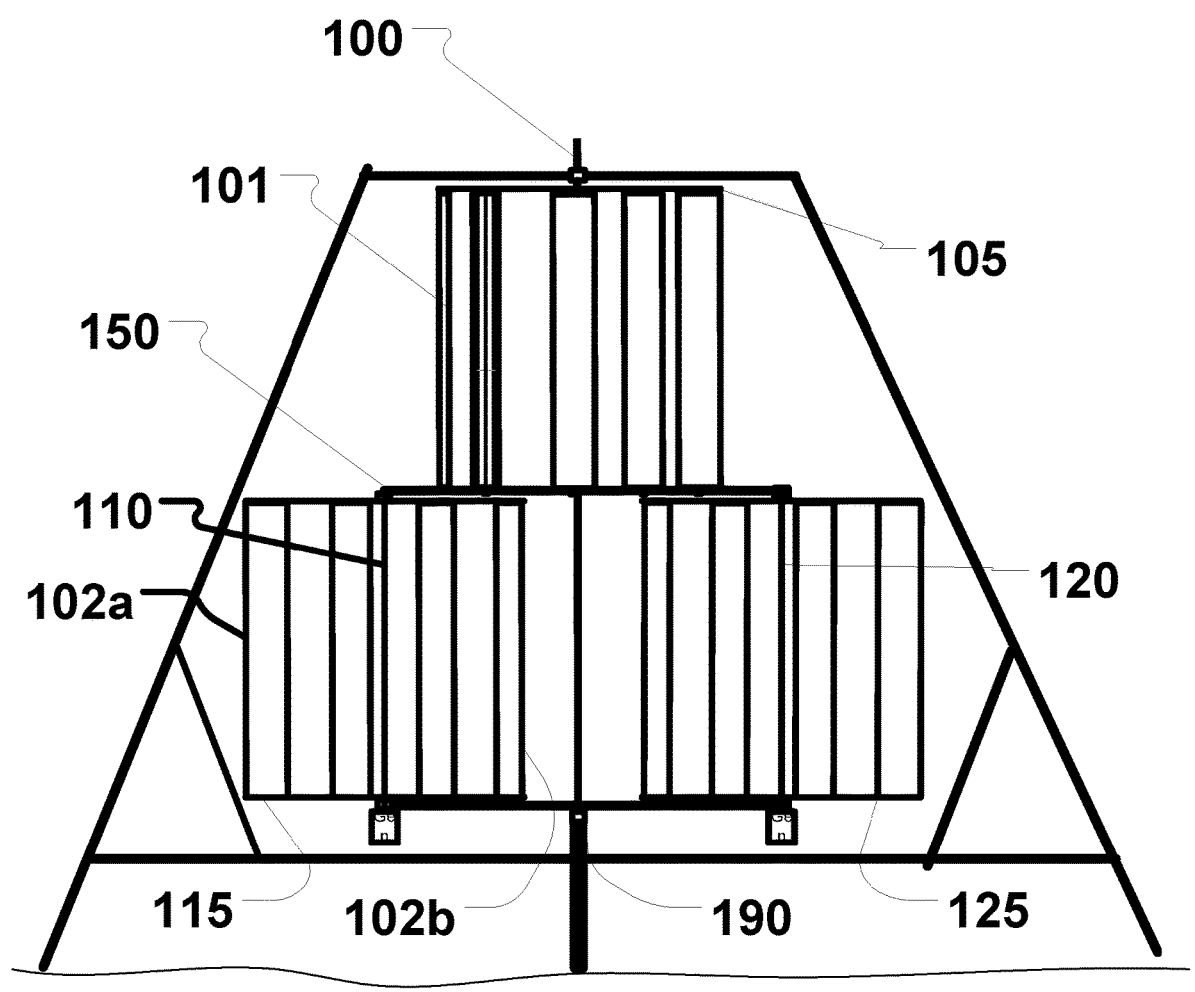

This invention relates to the generation of electricity from wind using a multi-rotor, multi-axis wind turbine with increased efficiency obtained by the orientation, shape, and rotation of the rotors with respect to each other, where primary rotors are used to drive secondary rotors into the air flow.

2. Description of Related Art Including Information Disclosed Under 37 CFR 1.97 and 37 CFR 1.98

It is well known in the art that vertical and horizontal axis rotors do not fully utilize or capture the energy of wind velocity at a single turbine location. Current implementations of harnessing wind energy rely upon large arrays of single turbines spread over a wide area. Each individual turbine operates with low efficiency and efficacy not fully utilizing the energy of the wind velocity. Prior art implementations capture only a fraction of the wind velocity passing a single turbine location.

U.S. patent 2003 to Van Osdel, U.S. Pat. No. 6,779,966 to Smith II et al. and U.S. Pat. No. 4,280,417 to Fork all demonstrate a well-known principle in the prior art of adjusting the angle of attack of the vanes of a rotor to help reduce drag and increase lift by controlling orientation of individual vanes of the rotor. While prior art angle of attack vane adjustment designs reduce the drag and increase lift, increasing the efficiency, no prior art implementations of the same nature fully capture the force of the wind passing the location of the rotor. The current invention seeks to improve over the prior art by increasing the amount of energy captured by minimizing the drag and maximizing lift utilizing a system of primary and secondary rotors where the primary rotor has vanes with adjustable angle of attack for controlling velocity of a primary rotor that actuates said secondary rotors into the surrounding air and the orientation of the primary and secondary axes are such that the coefficient of drag imposed on the secondary rotors is less than the coefficient of lift for a given secondary rotor.

U.S. Pat. No. 5,380,149 to Valsamidas demonstrates primary and secondary vanes for directing wind flow onto the vanes of a rotor. This design improves the efficiency of the wind captured at a single location, reducing drag and increasing lift by directing the wind flow into the rotors of the turbine. By altering the direction and flow of the wind velocity, some energy is taken out of the flow when it is redirected. The current invention seeks to improve over the prior art by improving the amount of energy captured at a single location by fully utilizing the power of the incoming wind velocity by using it to actuate one or more secondary rotors into the surrounding air increasing the overall relative net vector velocity of said secondary rotors without changing the direction of the incoming wind velocity.

U.S. Pat. No. 5,876,181 to Shin demonstrates utilizing a primary rotor and axis and secondary axes and rotors in a wind turbine design. The invention in U.S. Pat. No. 5,876,181 to Shin is intended to improve efficiency by reducing turbulence. The current invention seeks to improve over the prior art by capturing both the wind velocity and the rotational velocity due to the impelling force of the surrounding air on the secondary rotor as it is forced by the rotation of the primary rotor transferring power from the primary axis to the secondary rotors to create a relative net vector velocity on the secondary rotor which is directly proportional to the power generated. Further, the overall energy of the secondary rotors is increased by transferring rotational energy from the primary rotor onto the secondary rotors increasing the relative net vector velocity of the secondary rotors, which is directly proportional to the power output of the secondary rotors. Further the present invention improves over the prior art by choosing a secondary rotor shape that maximizes the coefficient of lift over drag as the secondary rotor is rotated into the surrounding air. Further, the present invention Improves over the prior art by orientating the primary and secondary rotors in relationship to one another such that the secondary rotors' rotational velocity is a function of the rotational velocity of the primary rotor and the distance from the primary axis, which further maximizes the coefficient of lift over drag for the secondary rotors.

U.S. Pat. No. 7,755,210 to Kammer et al. demonstrates a typical three vane wind turbine design with incorporated angle of attack of the vanes to control overall rotor rotation speed and power output. The current invention seeks to improve over the prior art by employing the vane angle of attack to control the speed at which secondary rotors are actuated into the wind velocity and incorporates a much larger system of design to which the vane angle of attack is being employed to regulate angular rotation, thus controlling the secondary turbines relative net vector velocity and power output.

U.S. Pat. No. 7,494,315 to Hart demonstrates a well-known principle in the art of using twists and curvature of rotor vanes to more efficiently capture wind velocity. The current invention seeks to improve over the prior art by having vanes with twists or curves or curvature incorporated into secondary rotors that are part of a system wherein the secondary rotors are actuated by a primary rotor and the distance between the primary rotor and secondary rotor along with the shape of the secondary rotor vanes works to maximize the coefficient of lift over drag for the secondary rotors and improve the efficiency of energy captured from a given wind velocity at a single turbine location.

In the current state of the art, vanes of rotors have the tip of the vanes traveling at a high speed of as much as 100 mph with the axis only doing 15 rpm. The current invention seeks to improve over the prior art by taking advantage of the angular velocity at the end of a support arm that is located in a concurrent radial direction with the primary rotor vanes by having a secondary rotor located a distance away from the center of the primary rotor and attached to said support arm, where the lift is maximized on the outer vanes and additionally the drag is reduced on the inner vanes because the relative wind vector velocity is low near the primary axis because of the difference in the radius from the primary axis to the outer edges of the secondary rotor as it rotates in both the primary and secondary axes.

The state of the art for wind turbine design employs a passive system to which a rotor is affixed and generates energy based on the rotor rotation which is directly proportional to the wind velocity passing its location. Since said rotor location is fixed with respect to the wind, the rotational velocity of the rotor axis is zero and the relative net vector velocity of the rotor with respect to the wind velocity and surrounding air s exactly equal to the wind velocity.

The current invention seeks to improve over the prior art by allowing control over the relative net vector velocity of secondary rotors by controlling the rate at which the primary rotor actuates the secondary rotors into the flow of wind velocity and surrounding air. While still dependent upon a flow being present, the current invention can harness a greater amount of energy from the same wind velocity over a single location of wind velocity capture over the prior art. Additionally, the current invention can limit the amount of relative net vector velocity by controlling how fast the secondary rotors are actuated into the wind velocity allowing for greater control of output in energy generation.

The current invention seeks to improve the efficiency of energy captured by wind velocity by harnessing the energy in a way that dramatically increases the amount of energy captured from a single turbine location. The secondary rotors will be actuated by the wind velocity plus the rotational velocity of the secondary rotor into the surrounding air. The sum of the wind velocity and the rotational velocity results in an increased relative net vector velocity of the rotor with respect to the wind velocity and surrounding air. The relative net vector velocity on the secondary rotors is increased as they are forced into the wind velocity and surrounding air using the power of the same wind velocity on the primary rotor to cause the forcing action of the secondary rotors. Power output is a function of velocity cubed such that the additive effect of the secondary rotors rotational velocity plus the wind velocity on the secondary rotors creates a greater power output based on the cubed exponent of this relative net vector velocity. With the secondary rotors being actuated by a primary rotor which is powered by the same wind velocity which allows for a greater capture of wind energy from a given wind velocity over the prior art.

By allowing control of the primary rotor angle of attack the rate at which the secondary rotors are actuated into the wind velocity and surrounding air can be controlled, allowing for further control over the net energy captured at a single location.

BRIEF SUMMARY OF THE INVENTION

According to one embodiment a multi-rotor, multi-axis wind turbine comprises:

rotors in relative motion to one another to maximize the energy captured;
a primary axis and one or more secondary rotor axes;
a primary rotor connected to support arms that extend radially from a primary axis;
support arms connected to one or more secondary axes;
one or more secondary rotors located about secondary axes;
support arms that rotate secondary rotors into the surrounding air as the primary rotor is rotated by wind velocity, or other external means;
secondary rotors being a radial distance from a primary axis;
secondary rotors having vanes which have a curvature so that a wind velocity that acts on the primary rotor also acts to drive secondary rotors;
secondary rotor vane curvature being chosen so that the rotational velocity of the vanes of secondary rotors are a function of the rotational velocity of a primary rotor and a radial distance from the primary axis, so that the relative net vector velocity on the secondary rotor vanes is a function of the rotational velocity and wind velocity;
secondary rotors are a radial distance from the primary axis and a secondary rotor vane shape of curvature is chosen so that the part of the rotor most substantially responsible for drag is nearer the primary axis when moving into the wind velocity and surrounding air;
primary rotor vanes that are rotatable around their individual axis controlling the angle of attack for an individual vane so that support arms and secondary rotors rotational velocity can be adjusted by adjusting the angle of attack of the primary rotor vanes for a given wind velocity;
secondary rotor vane curvature that extends in the same direction as the radial distance of a rotor;
where primary and secondary axes are vertical;
where primary and secondary rotors have opposite directions of rotation;
where the relative net vector velocity is a function of the rotational velocity of secondary rotors and the wind velocity;
the relative net vector velocity applied to secondary rotor vanes is transferred into rotational energy about the secondary rotor axis and captured and transferred into power output such as electrical power generation;
secondary rotor vanes are designed such that they capture wind from both the rotational velocity and wind velocity;
support arms that rotate secondary rotors into the surrounding air as a primary axis is rotated by external means, external means is one of wind velocity or electric motor or other actuating means;
power is transferred from the primary axis to secondary rotors.

According to another embodiment a multi-rotor, multi-axis wind turbine comprises:

rotors in relative motion to one another to maximize the energy captured;
a primary axis and one or more secondary rotor axes;
a primary rotor connected to support arms that extend radially from a primary axis;
support arms connected to one or more secondary axes;
one or more secondary rotors located about secondary axes;

support arms that rotate secondary rotors into the surrounding air as the primary rotor is rotated by wind velocity, or other external means;
secondary rotors being a radial distance from a primary axis;
secondary rotors having vanes which have a curvature so that a wind velocity that acts on the primary rotor also acts to drive secondary rotors;
secondary rotor vane curvature being chosen so that the rotational velocity of the vanes of secondary rotors are a function of the rotational velocity of a primary rotor and a radial distance from the primary axis, so that the relative net vector velocity on the secondary rotor vanes is a function of the rotational velocity and wind velocity;
secondary rotors are a radial distance from the primary axis and a secondary rotor vane shape of curvature is chosen so that the part of the rotor most substantially responsible for drag is nearer the primary axis when moving into the wind velocity and surrounding air;
primary rotor vanes that are rotatable around their individual axis controlling the angle of attack for an individual vane so that support arms and secondary rotors rotational velocity can be adjusted by adjusting the angle of attack of the primary rotor vanes for a given wind velocity;
secondary rotor vane curvature that extends in the same direction as the length of the axis of a rotor;
where primary and secondary axes are horizontal;
where primary and secondary rotors have opposite directions of rotation;
where the relative net vector velocity is a function of the rotational velocity of secondary rotors and the wind velocity;
the relative net vector velocity applied to secondary rotor vanes is transferred into rotational energy about the secondary rotor axis and captured and transferred into power output such as electrical power generation;
secondary rotor vanes are designed such that they capture wind from both the rotational velocity and wind velocity;
support arms that rotate secondary rotors into the surrounding air as a primary axis is rotated by external means, external means is one of wind velocity or electric motor or other actuating means;
power is transferred from the primary axis to secondary rotors.

DRAWINGS

The advantage of the present invention can be best understood by referencing the definitions and descriptions of the two exemplary embodiments of a best mode of the current invention in the following detailed description with reference to the accompanying drawings:

FIG. 1—side view of a vertical axis system of rotors according to the current invention.

Figure 2:
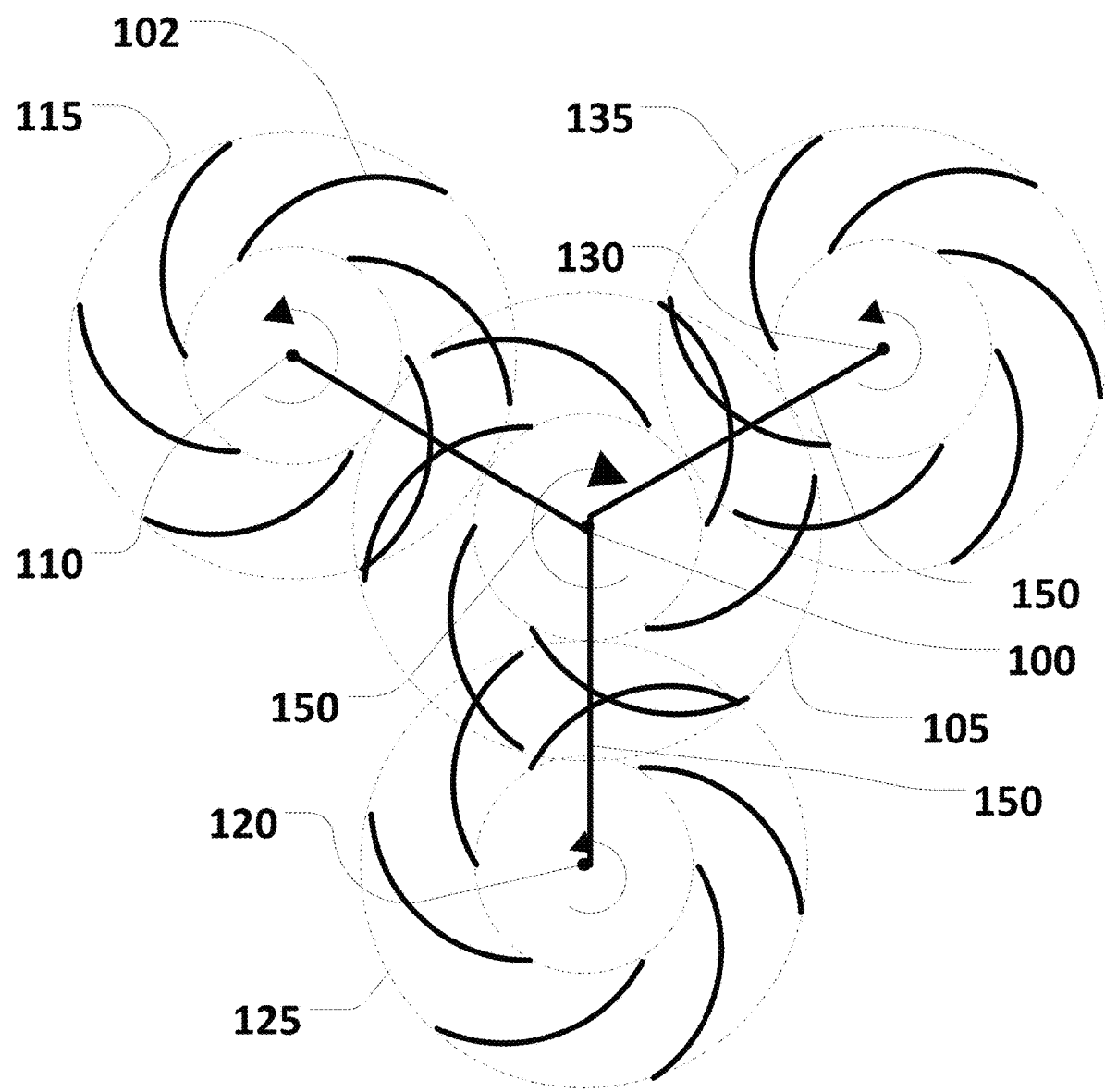

FIG. 2—top down view of a preferred embodiment of the present invention using a vertical axis system of rotors.

Figure 3:
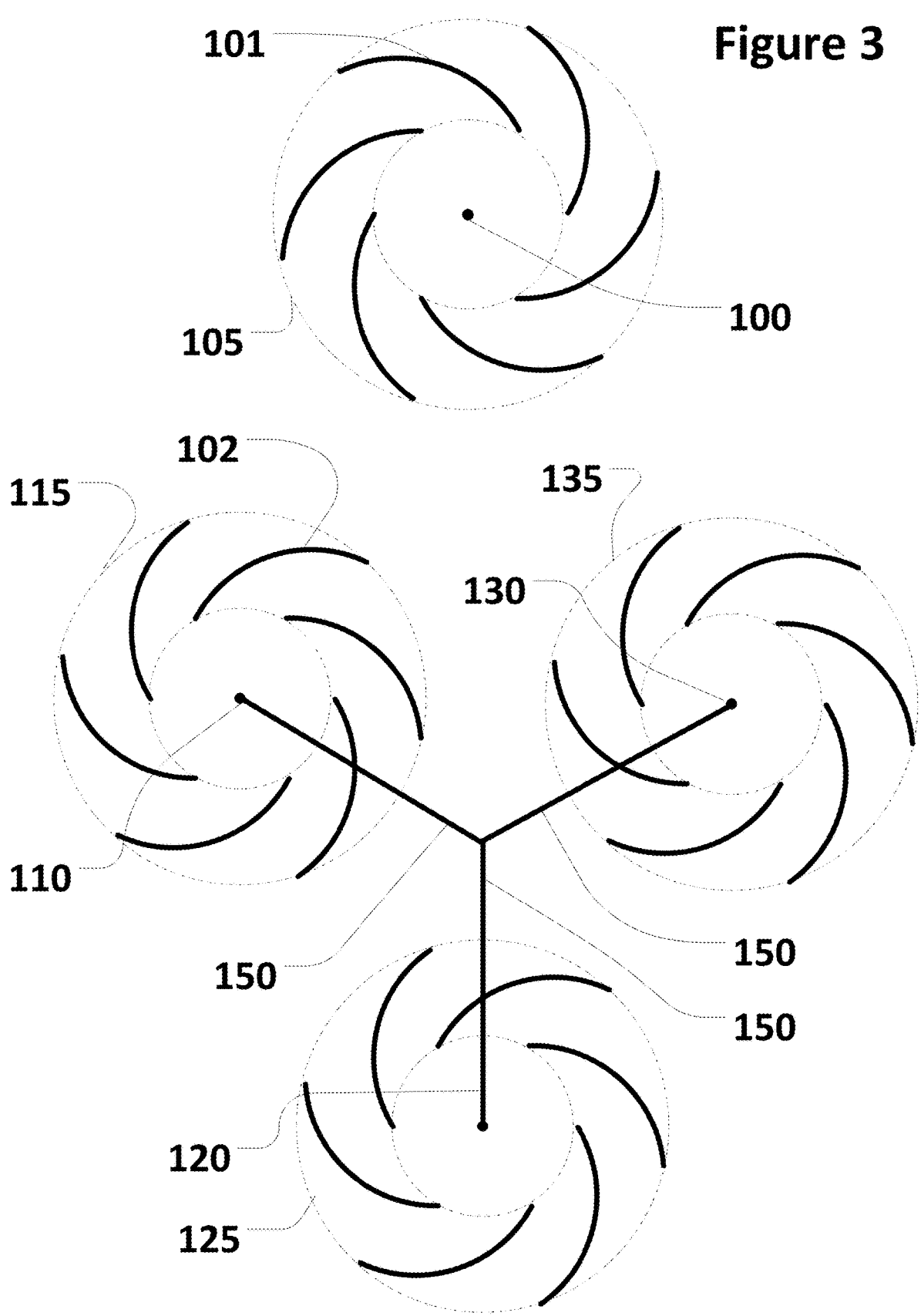

FIG. 3—top down view of a preferred embodiment of the present invention using a vertical axis system of rotors with the primary and secondary axes viewed separately as if disassembled from each other.

Figure 4:
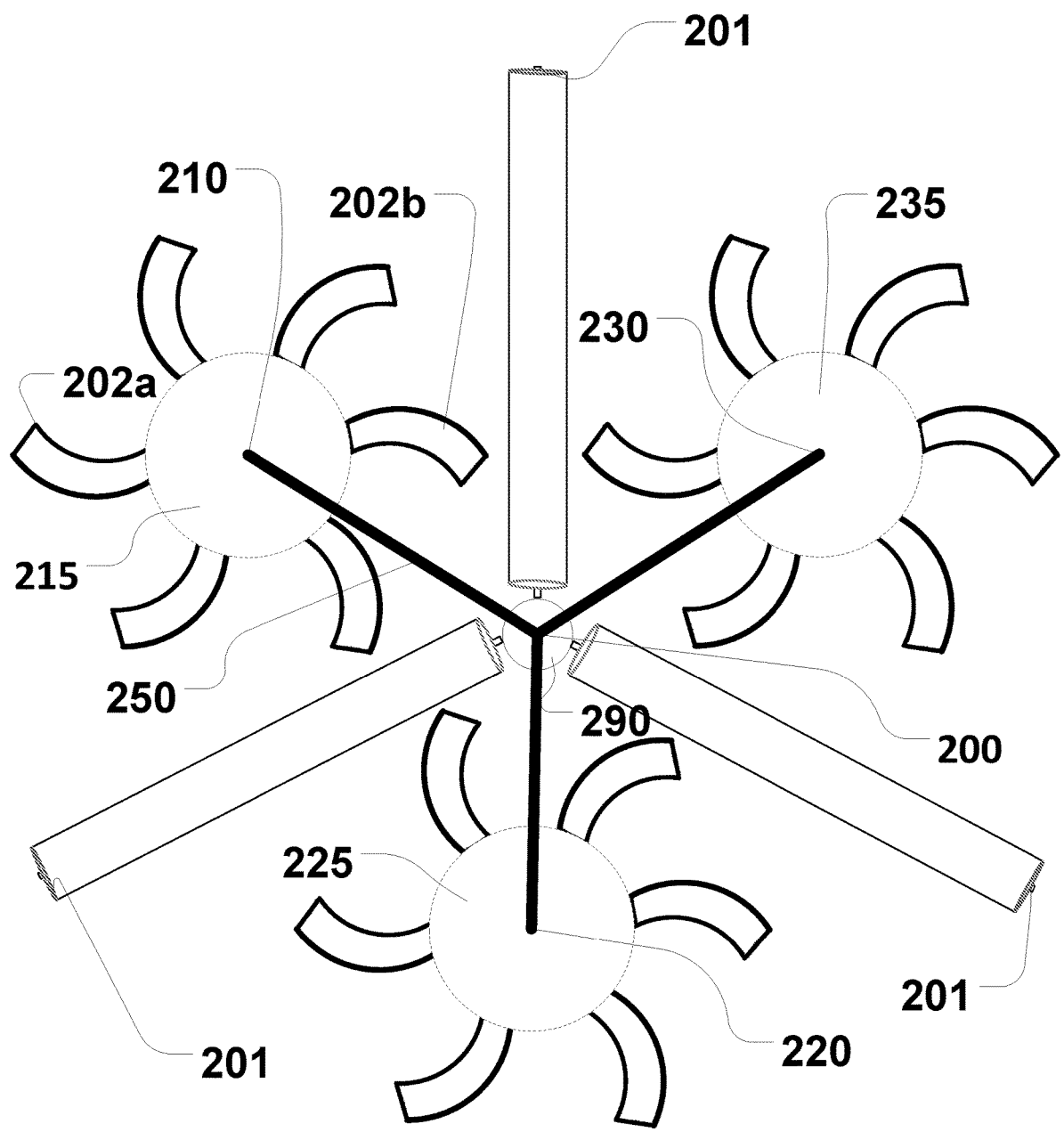

FIG. 4—simplified representation of the primary and secondary rotors for one preferred embodiment of the present invention that uses a horizontal axis system of rotors.

Figure 5:
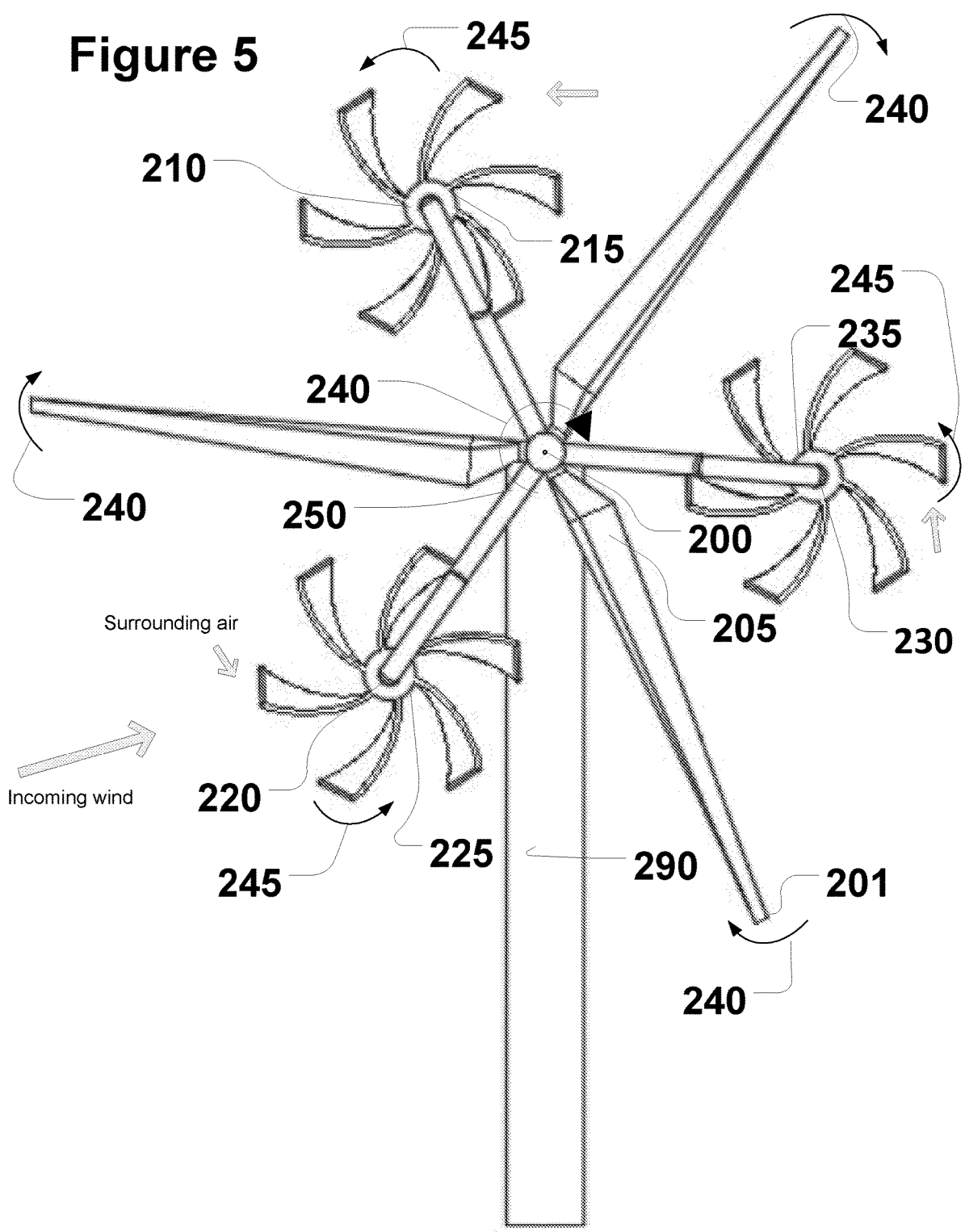

FIG. 5—horizontal ads embodiment of the present invention viewed from the front including primary rotor, secondary rotors, main support shaft and secondary rotor support arms according to one embodiment.

Figure 6:
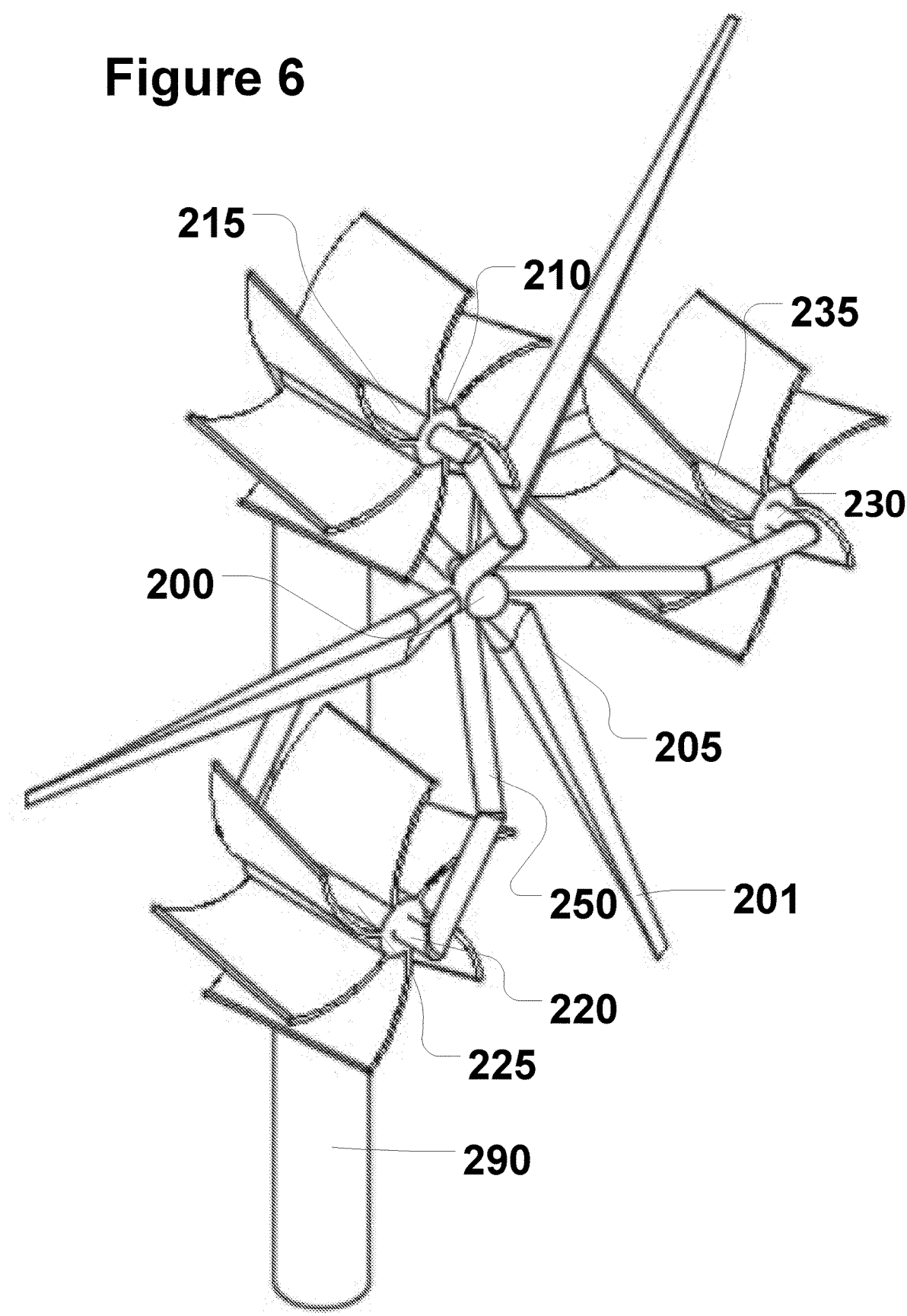

FIG. 6—horizontal axis embodiment of the present invention viewed from an angle which shows the primary rotor, secondary rotors, and secondary rotor support arms according to one embodiment.

Figure 7:
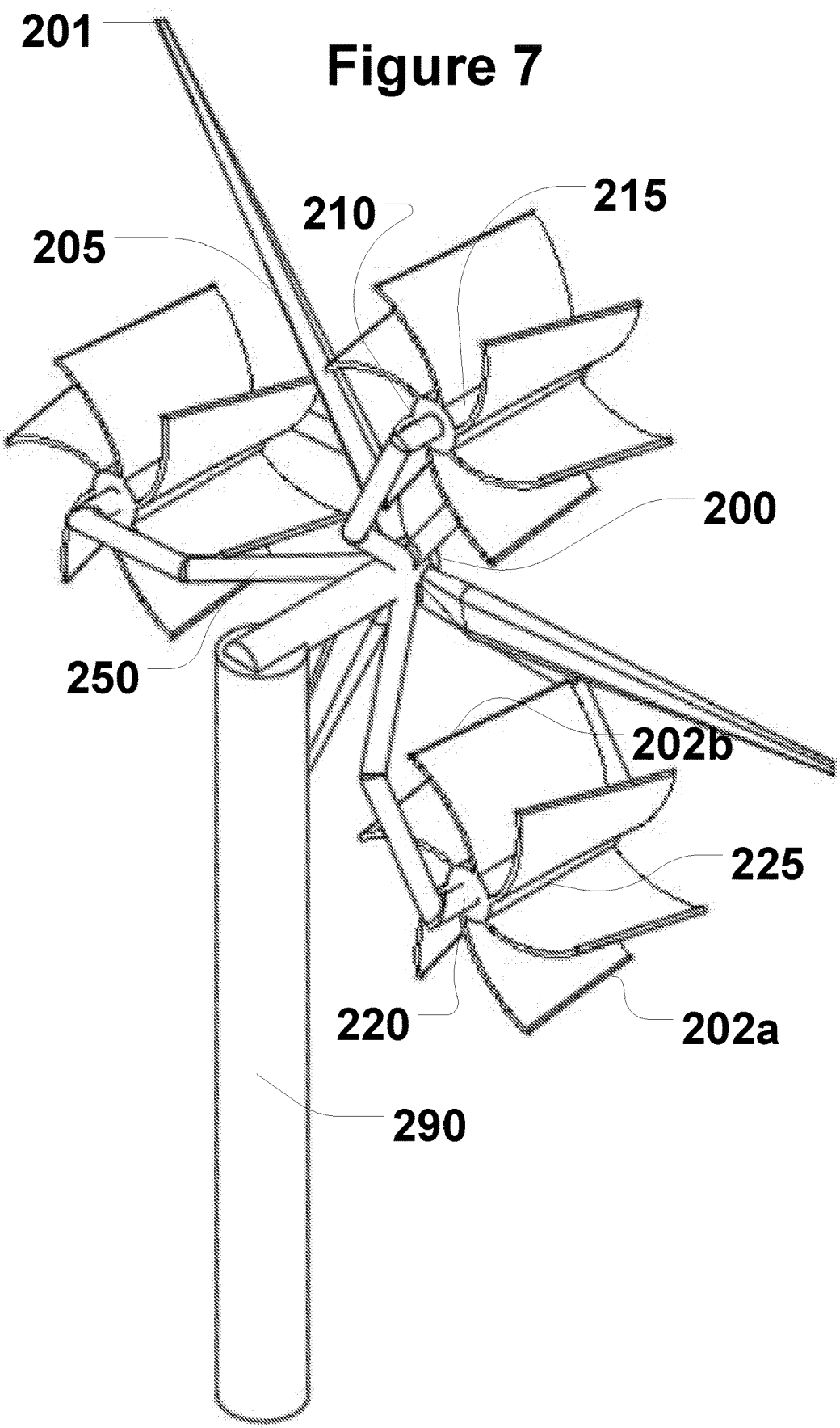

FIG. 7—horizontal axis embodiment design of the present invention viewed from the back which shows the primary rotor, secondary rotors, and secondary rotor support arms according to one embodiment.

Figure 8:
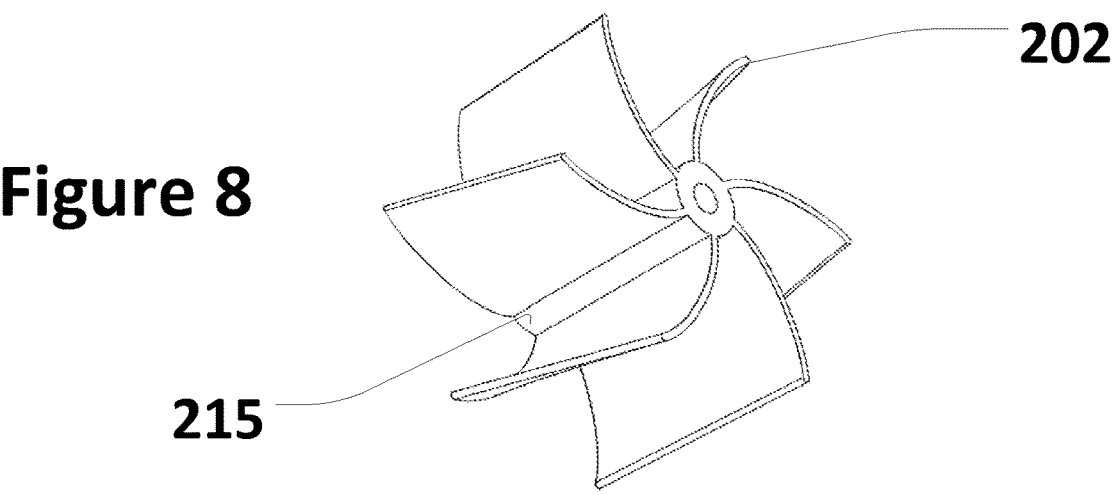

FIG. 8—angle view of one preferred embodiment of a secondary rotor according to one embodiment of a horizontal aids embodiment of the current invention.

Figure 9:
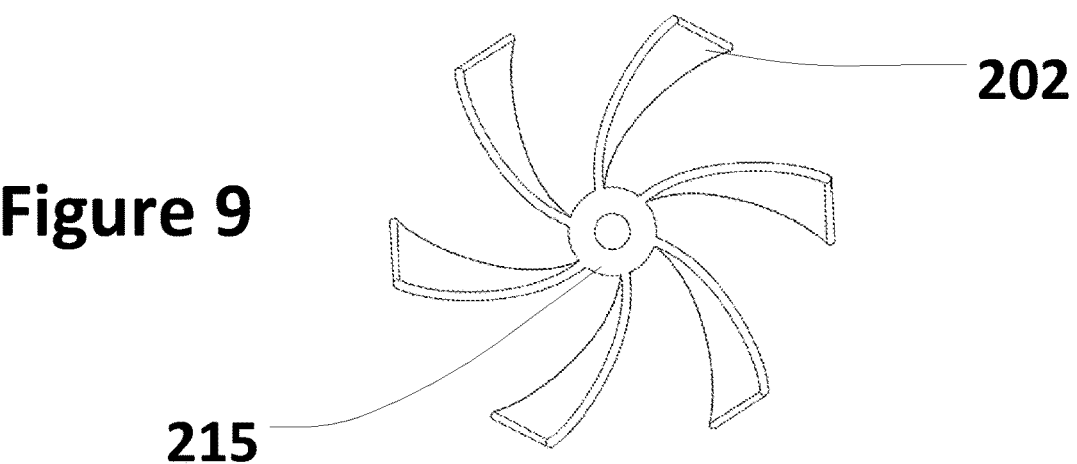

FIG. 9—top down view of one preferred embodiment of a secondary rotor according to one embodiment of a horizontal axis embodiment of the current invention.

Figure 10:
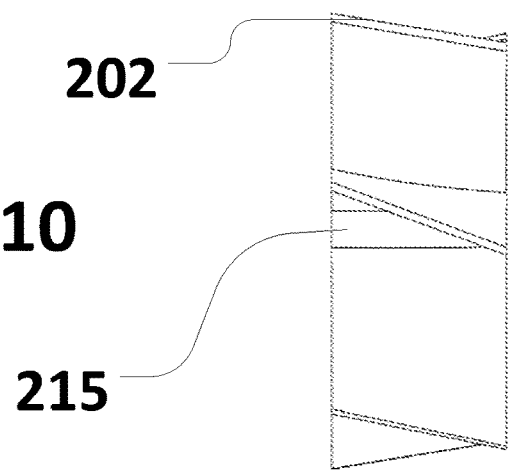

FIG. 10—side view of one preferred embodiment of a secondary rotor according to one embodiment of a horizontal axis embodiment of the current invention.

DETAILED DESCRIPTION OF THE INVENTION

As alternative means of power generation are becoming more prevalent in providing power to the nations' power grid the generation of electricity has become more dependent upon sources that are neither controllable nor reliable in their output. In order to reduce emissions from stationary power sources such as coal fired and natural gas fired power generating stations, alternative energy sources are becoming more in demand and prevalent in providing power to the nations' power grid. Solar and wind are two primary examples, neither of which can be switched on or off to provide base load but must be harnessed based on varying factors that cannot be easily controlled.

With the increase in solar energy available during the day, many power generating stations are not operating during this time in which the energy from the sun supplies the necessary electrical demand of the power grid. When the sun sets in the evening and people are returning home, the electrical demand is increasing right when the power output from solar is decreasing forcing power generating stations that use fossil fuels to ramp up rapidly near the end of the day.

This phenomenon is commonly referred to as the "Duck Curve", since the shape of power generation performed by the fossil fuel stations follows what looks like the shape of a duck, being moderate in the morning and representing the tail of the duck, dipping low during the middle of the day when solar is active and representing the belly of the duck and ramping up sharply near the end of the day to meet demand when solar no longer provides adequate power and representing the long neck of the duck. As time continues, more solar power will become available and the slope of the ramp of electrical demand in the evening will increase, potentially beyond the capacity of power generating stations using fossil fuels.

The present invention seeks to solve this problem by utilizing electricity generation from wind. As the sun sets and solar decreases, the change in the temperature increases the amount of wind that is generated. By efficiently capturing this wind in a controllable manner the electrical demand required of power generating stations can be reduced to help control the ramp up requirements of electrical generating stations in the evenings.

Aerodynamic theory and test data demonstrate that the coefficient of lift is larger than the coefficient of drag for most modern air foils. With properly designed vanes, the coefficient of lift for each vane can be much greater than the coefficient of drag. It is also known that the power output of a wind system is a function of the velocity cubed of the relative air speed ($P=\frac{1}{2}\rho A v^3$). The relative linear velocity of a member of a rotating system is a function of the distance from the axis of rotation ($v=r\omega$). This invention capitalizes on these concepts to produce a more efficient and higher power-output wind-driven system. This system creates far greater potential lift and power output than standard wind systems.

For the described preferred embodiments in this disclosure, "surrounding air" is understood to be the air surrounding the device that the secondary rotors are impelled upon, "wind velocity" is understood to be the flowing air that is the acting force that actuates the primary rotor and acts upon the secondary rotors, "rotational velocity" Is the speed at which the secondary rotor axes are driven into the surrounding air such that additional lift is created on the secondary rotors, and "relative net vector velocity" is the vector force acting upon a secondary rotor vane and s the sum of the wind velocity and the rotational velocity. The word "turbine" is meant to refer all of the structure of an embodiment of the current invention including support arms, axes, rotors, vanes and all other physical means that encompass the whole of the embodiment and not a single rotor or set of vanes around an axis.

This invention allows for the lift force acting upon the primary system to be transferred to rotational energy. This rotational energy is transferred to the secondary systems. The relative linear velocities of the vanes of the secondary systems are a function of the distance from the primary system axis. As the vanes of the secondary system are driven into the surrounding air, the rotational velocity provides lift force to the secondary vanes. Rotational energy from the secondary systems an then be transferred into power output such as electrical power generation.

This is accomplished by having a complex of vanes rotating around a complex of axes. Said system consists of a primary set of wind driven vanes attached to a primary axis. The primary system captures energy from the wind and transfers it into rotational energy. One or more secondary systems consist of sets of vanes that are attached to a secondary axis. The axis of the secondary system is attached by support arms to the axis of the primary system. The rotational energy from the primary system is used to drive the vanes of the secondary systems. Due to the rotational energy, the net vector velocities of the vanes of the secondary systems are increased relative to the air surrounding the system. The secondary systems utilize the rotational motion created by the primary system to create a higher relative net vector velocity of the outer vanes relative to the air. This is accomplished by the secondary rotor systems turning on an axis that is either parallel to, or offset by an angle to, the primary system axis.

The power output from an air foil is a function of velocity cubed ($P=\frac{1}{2}\rho A v^3$). The vanes furthest away from the primary axis have a maximized relative net vector velocity with respect to the surrounding air. This relative net vector velocity with respect to the surrounding air can be greater than the actual movement of the air flow. The system is designed such that the wind velocity and rotational velocity of the vanes are additive to provide even greater power output. The systems are also designed such that the drag can be minimized as the inner vanes of the secondary systems are near the primary axis and have reduced velocity being closer to the primary axis.

The relative net vector velocity of each vane in the secondary systems is a function of their distance from the center of the primary axis and the rotational velocity of said primary ads. The further the vane is from the primary axis the greater the relative speed with respect to the surrounding air. The vanes of the secondary system on the outer edge of said system have a greater relative speed than the vanes of the secondary system that are close to the primary system axis. The system is designed such that said outer vanes from the secondary systems produce the greatest lift and overall system power output and said inner vanes are responsible for the drag of the system where the relative speed of the vane producing drag is reduced.

The current invention transfers rotational energy of a primary rotor into rotational energy of one or more secondary rotors by employing rotational motion of the primary rotor. The primary rotor is driven by wind velocity, or some other fluid, to force a rotational motion of one or more of said secondary rotor axes. The secondary rotor axis motion is coincident with the primary axis rotor motion and a function of the radial distance from the primary axis. The secondary rotor axis is arranged with respect to the primary axis so that said secondary axis motion is transverse with respect to the wind velocity that actuates the primary rotor. The air impaling the secondary rotor vanes as the secondary rotor is forced into the surrounding air by the rotation of the primary axis increases the rotational energy of the secondary rotors.

In one preferred embodiment of the present invention, a vertical axis system of rotors is employed as demonstrated in FIGS. 1-3. FIG. 1 illustrates a side view of a vertical axis system of rotors according to the current invention. FIG. 2 represents a top down view of another preferred embodiment of the present invention using a vertical axis system of rotors. FIG. 3 represents the same embodiment as FIG. 2 with the primary and secondary axes viewed separately as if disassembled from each other. There is a primary aids (100) and a plurality of secondary axes (110, 120, 130). In the present embodiment there is one primary aids and three secondary axes with two of them visible in FIG. 1 and all three visible in FIG. 2 and FIG. 3.

The primary axes have mounted to them a plurality of vanes (101). The secondary axes have mounted to them a plurality of vanes (102). Each axis functions as the rotational center of a rotor (105, 115, 125, 135) that captures the wind velocity that acts upon the vanes. The vanes (101) of the primary axis are orientated such that the rotation of the primary axis (100) is in the opposite direction of the rotation of the secondary axes (110, 120, 130). The primary ads (100) is mounted to the secondary axes (110, 120, 130) with support arms (150) that extend out in a radial direction from the center of the primary axis such that as the primary ads (100) rotates due to the velocity of the wind on the vanes (101) of the primary rotor (105), each of the support arms (150) along with the secondary axes (110, 120, 130) and rotors (115, 125, 135) are rotated around the primary axis (100). As the primary axis (100) rotates, the secondary axes (110, 120, 130) and secondary rotors (115, 125, 135) are forced into the surrounding air at the rotational velocity of the primary rotor (105) transferring power from the primary axis to the secondary rotors. The orientation of the secondary rotor (115, 125, 135) vanes are such that the rotational direction of the secondary rotors (115, 125, 135) and axes (110, 120, 130) are opposite the rotational direction of the primary rotor (105) and axis (100). The secondary rotor vanes shown in FIGS. 1-3 are one preferred embodiment in which the rotational energy of the primary rotor is transferred to the secondary rotors utilizing opposite directions of rotation.

The present invention employs a function of the distance of a secondary rotor (115, 125, 135) from the primary axis (100) to maximize the coefficient of lift over that of drag for a secondary rotor. The orientation of the secondary ax vanes (102) are such that as the secondary rotor (115) rotates around the primary aids (100) and its own respective secondary axis (110), the vane (102a) furthest from the primary axis is responsible for the greatest lift of the rotor around the secondary axis (110) with respect to the surrounding air and the vane closest to the primary aids (102b—FIG. 1) is responsible for the most drag encountered as the secondary axis (110) rotates about the primary axis (100). The outer vane (101a) has a greater relative net vector velocity than the inner vane (101b—FIG. 1) because it is further from the primary axis (100) about which rotation is taking place, thus the rotational velocity of lift is greater than the rotational velocity of drag and this maximizes the coefficient of lift over drag.

The secondary rotor vanes (102) are constructed for a vertical ads turbine in a manner that maximizes the coefficient of lift over drag and can best be seen in FIG. 3. The vanes have a curvature that runs the radial length of the rotor (115). The curvature is such that the angle of attack where the incoming wind velocity first impels the rotor is less than the angle of attack where the wind velocity leaves contact with the rotor. The shape of the vanes shown in FIG. 3 is one preferred embodiment for a vertical axis turbine but any shape in which drag is reduced and lift increased as a secondary rotor is rotated into the surrounding air would fit the needs of the present invention.

The orientation of the vanes of the primary and secondary axes along with the counter rotational direction between the primary and secondary axes work to maximize the relative net vector velocity of the secondary rotors. This is because the secondary rotors will capture both the wind velocity and the rotational velocity due to the motion of the secondary rotor into the surrounding air caused by the rotation of the primary axis which is itself actuated by the wind velocity. As the primary rotor and support arms actuate the secondary rotors into the surrounding air, this generates lift based on the rotational velocity of the secondary rotor with respect to the air into which it is being forced by the rotation of the primary ads. Therefore, the secondary rotor vanes collect an additive energy of wind velocity and rotational velocity which sum to a relative net vector velocity acting upon the vanes of the rotor. Because the primary axis is actuated by the wind causing the secondary axes to be forced into the surrounding air, the present invention captures a greater amount of energy at a given location for a given wind velocity over the prior art.

Due to the circumferential nature of the wind capture of the vertical axis turbine embodiment of the present invention, the wind velocity will be captured regardless of the incoming wind velocity direction. The turbine can be constructed in a way that allows it to be rotated with respect to the wind velocity. The vertical axis turbine can be rotated with respect to the wind velocity such that the primary axis is rotated about the supporting shaft (190) changing the direction at which it points toward the wind velocity. This can be employed along with ways of blocking wind velocity from actuating the primary rotor vanes from all 360 degrees of the rotor which would change the proportion of wind velocity captured and allow for the present invention to increase or decrease the rotational velocity of the primary axis.

In another preferred embodiment of the present invention, a horizontal axis system of rotors is employed as demonstrated in FIGS. 4-8. FIG. 4 shows a simplified representation of the primary and secondary rotors for one preferred embodiment of the present invention that uses a horizontal aids system of rotors. FIG. 5 shows one embodiment of a full horizontal axis turbine design of the present invention including primary rotor, secondary rotors, main support shaft and secondary rotor support arms. Figure shows another view of the same embodiment as FIG. 5 which shows the primary rotor, secondary rotors, and secondary rotor support arms. FIG. 7 shows another view of the same embodiment as FIG. 5 which shows the primary rotor, secondary rotors, and secondary rotor support arms. In FIGS. 4-8 the primary rotor has different blade size, shape and configuration than the secondary rotors, showing one preferred embodiment of a primary rotor in the horizontal axis embodiment of the present invention. FIGS. 8-10 show the secondary rotors from different angles showing one preferred embodiment of a secondary rotor in the horizontal axis embodiment of the present invention. There is a primary axis (200) and a plurality of secondary axes (210, 220, 230). In the present embodiment there is one primary axis and three secondary axes with two of them visible in FIG. 7 and all three visible in FIGS. 4, 5 and 6.

The primary axes have mounted to them a plurality of vanes (201). The secondary axes have mounted to them a plurality of vanes (202). Each ads functions as the rotational center of a rotor (205, 215, 225, 235) that captures the wind velocity that acts upon the vanes. The vanes (201) of the primary axis are orientated such that the rotation of the primary axis (200) is in the opposite direction of the rotation of the secondary axes (210, 220, 230).

The primary axis (200) is mounted to the secondary axes (210, 220, 230) with support arms (250) that extend out in a radial direction from the center of the primary axis such that as the primary axis (200) rotates due to the velocity of the wind on the vanes (201) of the primary rotor (205) each of the support arms (250) along with the secondary axes (210, 220, 230) and rotors (215, 225, 235) are rotated around the primary axis (200) transferring power from the primary axis to the secondary rotors. As the primary axis (200) rotates, the secondary axes (210, 220, 230) and secondary rotors (215, 225, 235) are forced into the surrounding air at a rotational velocity and the orientation of the secondary rotor (215, 225, 235) vanes are such that the rotational direction of the secondary rotors (215, 225, 235) and axes (210, 220, 230) are opposite the rotational direction of the primary rotor (205) and axis (200). The secondary rotor vanes shown in FIGS. 6-10 are one preferred embodiment in which the rotational energy of the primary rotor is transferred to the secondary rotors utilizing opposite directions of rotation.

In this representation, the primary axis (200) is presented rotating clockwise when facing the primary rotor (205), this can be either clockwise or counter clockwise and is arbitrarily chosen for demonstration purposes. The individual secondary rotors (215, 225, 235) In this embodiment are shown rotating counter clockwise about each respective individual secondary axis (210, 220, 230) as al the rotors are rotated clockwise by the support arms (250) connected to the primary axis. This clockwise rotation of the primary axis (200) and rotor (205) imparts a counter clockwise rotational velocity to each secondary rotor (215, 225, 235) that is proportional to the clockwise rotation of the primary rotor (205), support arms (250) and connected secondary rotors (215, 225, 235). This rotational velocity of the secondary rotors (215, 225, 235) multiplied by its distance from the primary ads (200) adds to the wind velocity acting on the secondary rotors (215, 225, 235) and produces a relative increased net velocity at which the secondary rotors (215, 225, 235) are rotating counter clockwise. The secondary rotors (215, 225, 235) are rotating faster than the rotational energy provided by the wind velocity on the secondary rotor by an amount equal to the rotational velocity imparted by the primary rotor (205). Because the energy collected is a factor of the velocity cubed, this added rotational velocity greatly improves the efficiency of energy captured at a single location over the prior art.

The present invention has a variable secondary rotor velocity that is a function of the distance of a secondary rotor (215, 225, 235) from the primary axis (200) to maximize the coefficient of lift over that of drag for a secondary rotor. The orientation of the secondary axes vanes (202) are such that as the secondary rotor (215) rotates around the primary axis (200) and its own respective secondary axis (210), the vane (202a—FIG. 4) furthest from the primary axis is responsible for the greatest lift of the rotor around the secondary axis (210) with respect to the surrounding air and the vane closest to the primary axis (202b—FIG. 4) is responsible for the most drag encountered as the secondary axis (210) rotates about the primary axis (200). The outer vane (202a—FIG. 4) has a greater relative net vector velocity than the inner vane (202b—FIG. 4) because it is further from the primary axis (200) about which rotation is taking place, thus the rotational velocity of lift is greater than the rotational velocity of drag and this works to maximize the coefficient of lift over drag.

The horizontal aids turbine can be rotated with respect to the wind direction such that the primary axis is rotated about the supporting shaft (290) changing the direction at which it points toward the wind velocity. This can change the proportion of wind velocity that can be captured at a single location to increase or decrease the rotational velocity of the primary axis.

The secondary rotor vanes (202) are constructed for a horizontal axis turbine in a manner that maximizes the coefficient of lift over drag and can best be demonstrated by referring to FIGS. 8-10. The vanes have a curvature that runs the length of the rotor (215). The curvature is such that the angle of attack where the incoming wind velocity first impels the rotor is less than the angle of attack where the wind velocity leaves contact with the rotor. The shape shown in FIGS. 8-10 is one preferred embodiment for a horizontal aids turbine, but any shape in which drag is reduced and lift increased as a secondary rotor is rotated into the surrounding air would fit the needs of the present invention.

In the preferred embodiments shown in FIGS. 1, 5, 6, and 7 of this disclosure, the primary and secondary rotors are shown with parallel axes for ease of demonstration, but this need not be the case. The primary and secondary axes could be arranged in a way in which there is an angle of difference between the primary and secondary rotors' axes with respect to a common axis. Further the angle of difference for each secondary rotor could be a different angle for each individual axis. The horizontal and vertical axes designs could both be accomplished by having each axis have an angle offset from the horizontal or vertical, respectively that is specific to each rotor axis. The specific angle could be the same or different for each individual primary and secondary rotor axis. FIGS. 1, 5, 6, and 7 show an angle of offset of zero degrees for ease of demonstration, but any other angle could also be chosen. Changing the angle of the rotor axis with respect to the horizontal or vertical would allow for maximizing the coefficient of lift over drag for individual rotors utilizing the concepts of the present invention described above.

In both the horizontal and vertical design configurations the primary axis rotation due to the wind velocity causes the primary rotor to rotate with a rotational velocity that is translated to the secondary rotors via the support arms causing a rotational velocity to be imparted onto the secondary rotor vanes. The shape of the secondary rotor vanes can be constructed in such a manner that wind velocity and rotational velocity due to rotation about the primary aids work together to produce a relative net vector velocity of the secondary rotor that is greater than the wind velocity alone on the secondary rotor. Because the primary axis is actuated by the wind causing the secondary axes to be forced into the surrounding air, the present invention captures a greater amount of energy at a given location for a given wind velocity over the prior art.

In the current embodiment the primary ads is actuated by means of a primary rotor, this need not be the case to retain the essence of the invention and the primary ads could be actuated by other external means. The primary axis could be rotated by external means other than wind velocity acting upon a rotor without deviating from the spirit and intent of the present invention so long as the primary axis actuates the secondary rotor axes into the wind velocity and surrounding air to produce said secondary rotors' relative net vector velocity. The actuation of the primary ads need not be accomplished by wind velocity but could be forced by other extern means including, but not limited to, external driving forces such as a motor.

What is claimed is:

1. A multi-rotor, multi-axis wind turbine comprising:
a primary axis encompassed by a primary rotor,
a plurality of secondary axes,
each individual secondary axis of said secondary axes is encompassed by a rotor,
each individual secondary axis rotor of said secondary axes is identical in design,
said primary rotor is comprised of vanes connected directly to said primary axis,
said primary vanes extend outward from the center of said primary axis in a radial direction,
said primary rotor vanes rotate with said primary axis which said primary rotor encompasses and said rotation of said primary rotor vanes with respect to said primary axis is accomplished through rotation of said primary axis,
said primary axis has an axis of rotation about said primary axis center,
said individual secondary axis rotor is comprised of a hub which surrounds said individual secondary axis which said individual secondary axis rotor encompasses,
said individual secondary axis rotor hub has an axial length,
said individual secondary axis rotor hub has vanes solidly connected to said hub along entire span of said secondary axis rotor hub axial length,
said individual secondary axis rotor hub vanes extend in both axial and radial directions with respect to said secondary axis which said individual secondary axis rotor encompasses,
said individual secondary axis rotor hub vanes rotate with said secondary hub and said rotation of said secondary axis rotor hub vanes with respect to secondary axis which said individual secondary axis rotor encompasses is accomplished through rotation of said secondary axis rotor hub around said secondary axis which said individual secondary axis rotor encompasses, said individual secondary axis rotor has support arms connected directly to said primary axis that extend out in a radial direction from the center of the primary axis such that said support arms rotate in the same direction and at the same rotational velocity as said primary rotor, said individual secondary axis rotor support arms are solidly connected to each end of secondary axis which said individual secondary axis rotor encompasses such that said secondary axis of an individual rotor rotates around said primary axis in the same direction and at the same rotational velocity as said primary rotor, said individual secondary axis rotor rotates about said secondary axis which said individual secondary axis rotor encompasses, while said individual secondary axis, which said individual secondary axis rotor encompasses, rotates about said primary axis, said individual secondary axis rotor has a first axis of rotation defined by said secondary axis rotor hub and vanes rotating about said secondary axis which said individual secondary axis rotor encompasses, said individual secondary axis rotor has a second axis of rotation defined by said individual secondary axis, support arms, hub and vanes all rotating about said primary axis center, said primary vane rotation direction with respect to the primary axis is in the opposite direction of said individual secondary axis rotor hub vane rotation with respect to said individual secondary axis which said individual secondary axis rotor encompasses, said secondary axis rotor hub vanes have curvature along said vane extension in both radial and axial directions with respect to said secondary axis, said secondary axis rotor vane radial curvature where passing wind velocity enters said secondary axis rotor hub vanes is different than the curvature where passing wind velocity leaves said secondary axis rotor hub vanes, said difference in said secondary axis rotor hub vane radial curvature determines said secondary axis rotor hub vane axial curvature, said secondary axis rotor hub vane axial curvature captures rotational energy provided by passing wind velocity, said secondary axis rotor hub vane radial curvature captures rotational energy provided by said individual secondary axis rotor hub vanes being impelled by surrounding air due to rotational velocity imparted on said individual secondary axis rotor by said primary rotor rotation through said connected support arms, said individual secondary axis rotor is rotating, with respect to said first axis of rotation, faster than the rotational energy provided by wind velocity on said individual secondary axis rotor due to said individual secondary axis rotor rotational velocity, with respect to said second axis of rotation, imparted by said primary rotor, vector force acting upon a secondary axis rotor hub vane is the result of the wind velocity and said rotational velocity and this added rotational velocity greatly improves the efficiency of energy captured at a single location, said primary axis is driven by passing wind velocity and said motion drives said secondary axis rotors into the surrounding air increasing said relative net vector velocity that is applied to said secondary axis rotor hub vanes with respect to wind velocity and surrounding air.

2. A multi-rotor, multi-axis wind turbine as claimed in claim 1, wherein said secondary axis rotor rotational velocity is a function of the distance of said secondary axis rotor from said primary axis, said function being defined by said secondary axis rotor vane curvature and said secondary axis rotor rotation around said primary axis and its own respective secondary axis, wherein said secondary axis rotor hub vane furthest from said primary axis is responsible for the greatest lift of said secondary axis rotor around said secondary axis with respect to said surrounding air, wherein said secondary axis rotor hub vane closest to said primary axis is responsible for the most drag of said secondary axis rotor around said secondary axis with respect to said surrounding air as said secondary axis rotates about said primary axis, said secondary axis rotor hub vane force due to said surrounding air is greater the farther from the primary axis the location is, thus said secondary axis rotor rotational velocity of lift is greater than said secondary axis rotor rotational velocity of drag and this works to maximize the coefficient of lift over drag for said secondary axis rotor.

3. A multi-rotor, multi-axis wind turbine as claimed in claim 1 wherein said primary axis is rotated by external means.

4. A multi-rotor, multi-axis wind turbine as claimed in claim 3 wherein said external means is said wind velocity.

5. A multi-rotor, multi-axis wind turbine as claimed in claim 3 wherein said external means is a motor.

6. A multi-rotor, multi-axis wind turbine as claimed in claim 1 wherein power is transferred from said primary axis to said secondary rotors.

7. A multi-rotor, multi-axis wind turbine as claimed in claim 1 wherein said relative net vector velocity applied to said secondary axis rotor hub vanes is transferred into rotational energy about said secondary rotor axis and captured and transferred into power output such as for electrical power generation.

8. A multi-rotor, multi-axis wind turbine as claimed in claim 2 wherein said primary rotor vanes connected directly to said primary axis is equal to the number of said individual secondary axis rotors.

* * * * *